June 8, 1937.    B. PRATT ET AL    2,083,086
VALVE STRUCTURE
Filed May 16, 1935    3 Sheets-Sheet 1

Inventors
Best Pratt
George F. Weinreich

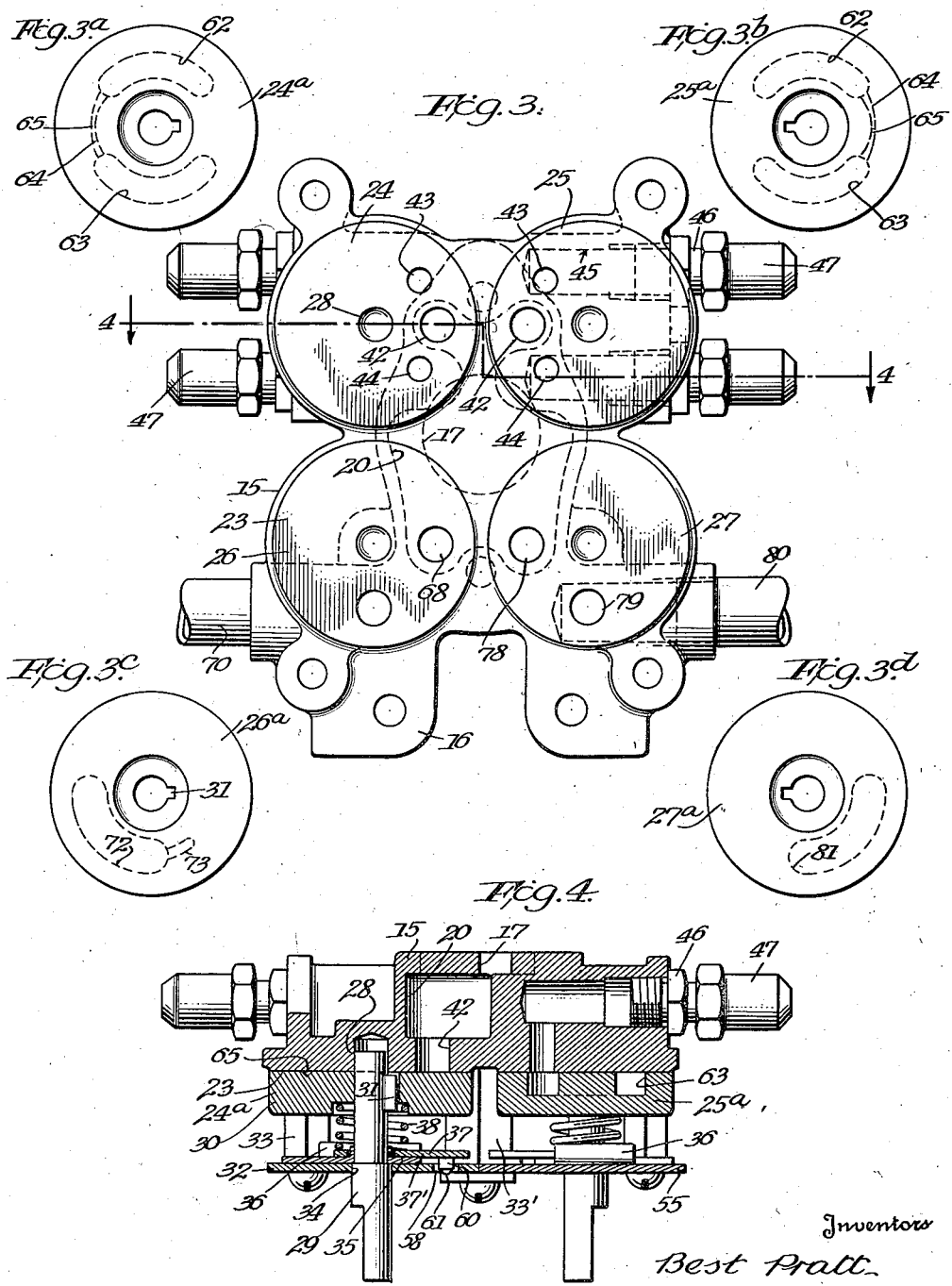

June 8, 1937.                B. PRATT ET AL                2,083,086
                              VALVE STRUCTURE
                            Filed May 16, 1935            3 Sheets-Sheet 3
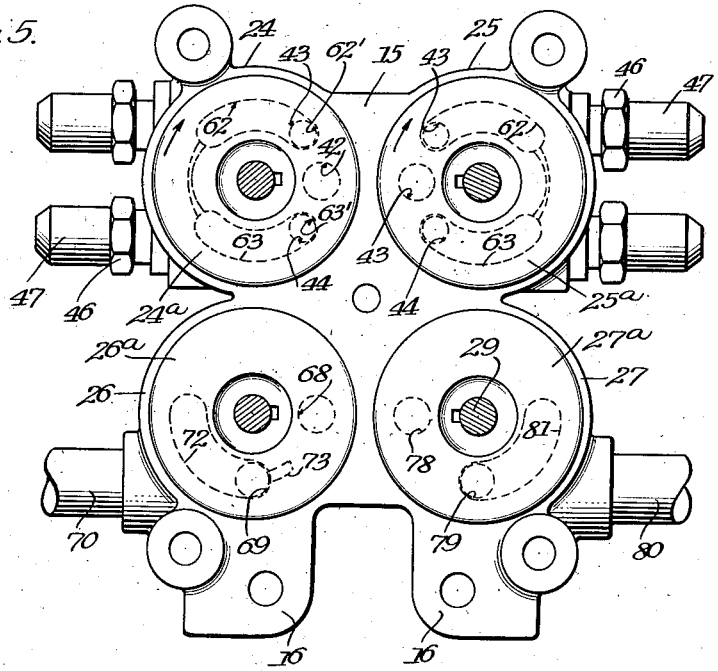
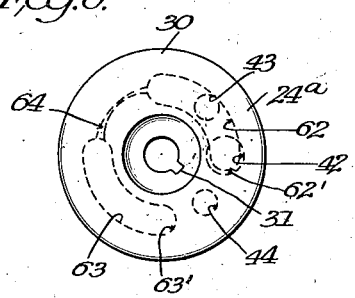
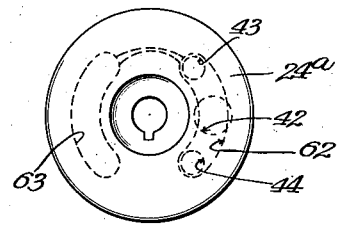
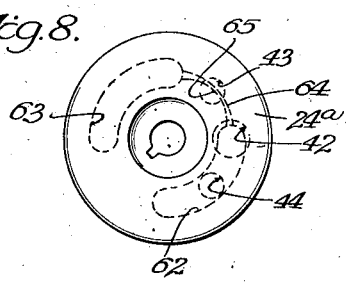
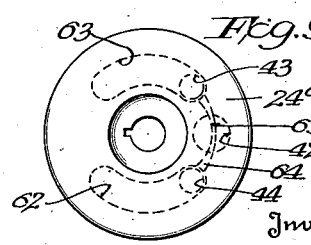
Inventors
Best Pratt
George F. Weinreich
By Cushman, Darby & Cushman
Attorneys Patented June 8, 1937

2,083,086

UNITED STATES PATENT OFFICE 2,083,086

VALVE STRUCTURE

Best Pratt and George F. Weinreich, Chicago, Ill., assignors to Brake Equipment & Supply Co., Chicago, Ill., a corporation of Illinois Application May 16, 1935, Serial No. 21,877

4 Claims. (Cl. 277—59)

The present invention relates to a valve structure and, more particularly, to a valve structure for use with gas ranges.

The principal object of the invention is to provide a valve structure for gas ranges in which the various valve elements will be compactly arranged, may be readily cleaned, and wherein proper locking and stopping means will indicate the various positions of the valves.

Other objects and advantages of the invention will be apparent from the following specification and drawings, wherein.

Figure 1:
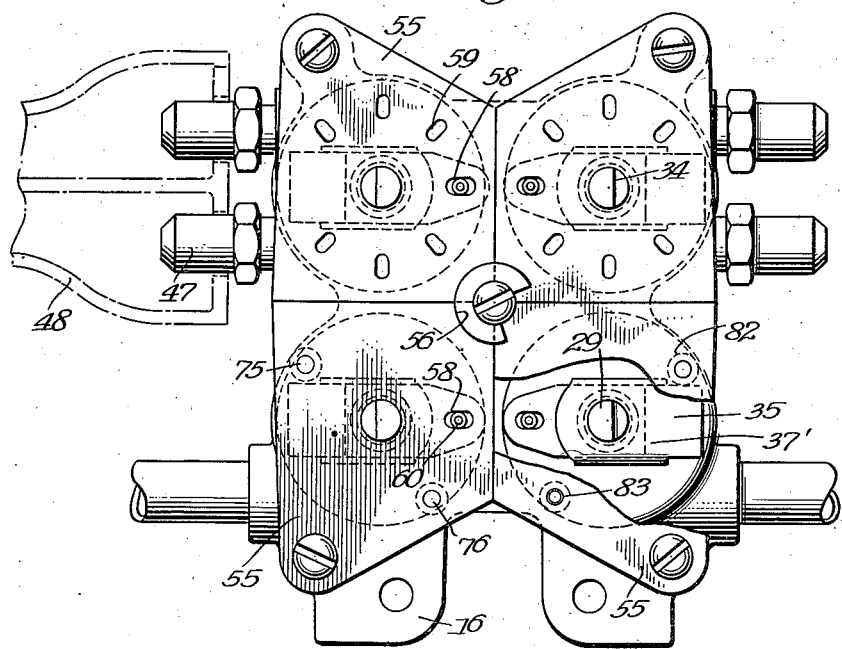
Figure 1 is a front elevation of the valve structure.
Figure 2:
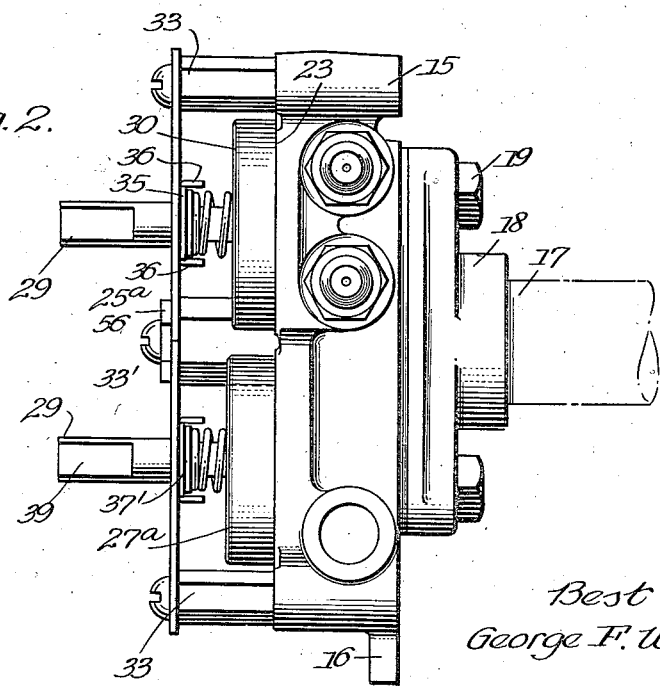
Figure 2 is a side elevation.

Figures 3, 3a, 3b, 3c, and 3d are front elevations of the valve body and the various valve elements associated therewith, respectively.

Figure 4 is a transverse horizontal sectional view of the valve structure taken on a line corresponding to the angled line 4—4 of Figure 3.

Figure 5 is a view, partly in vertical section, with the front plate structure and valve retaining springs removed, and Figures 6 to 9, inclusive, show various positions of one of the valve elements of the valve structure with respect to ports in the valve body.

Referring to the drawings, the numeral 15 designates the valve body or casing of the valve structure. The valve body is substantially rectangular in shape and provided with apertured lugs or ears 16 by means of which it may be secured to the front of the range frame so as to be spaced behind the front plate of the range casing. Gas is supplied to the valve body by means of a conduit 17 threaded to a flanged coupling 18 secured to the rear face of the valve body by bolts 19, the gas from conduit 17 flowing into the central chamber or manifold 20 indicated in Figure 3. The front or seat face 23 of the valve body 15 is preferably substantially flat and parallel to the rear face, so that the valve body may be readily cast and machined.

In the embodiment of the invention shown, the seat face 23 is provided with four valve seats. Two of these valve seats, the two upper ones indicated in the drawings and designated by the numerals 24 and 25 in Figures 3 and 5, are each intended to be connected to two top burners of the gas range. One lower valve seat 26 is designed to be connected to the broiler burner of the range and the other lower valve seat 27 would be connected to the oven burner. Each valve seat is provided with a central bore 28 in which the inner end of a valve stem 29 is rotatably and removably positioned.

The valve stems 29 each carry a disc valve or valve element generally indicated by the numeral 30, the valve element 30 being provided with a slot 31 in the central aperture through which the valve stem passes and in which slot a key formed on the valve stem fits, so as to cause the valve element to rotate with the valve stem. A plate structure 32 is supported upon posts 33 preferably extending from the corners of the seat face 23 and upon a post 33' extending from the central portion of the seat face, the posts being threadedly secured to the valve body. The plate structure 32 has apertures 34 therein through which the valve stems 29 project, and each valve stem has a flanged member 35 fixed thereto at such a position that the outer surface of this member will bear upon the inner surface of the plate structure 34. The flanges 36 of the members 35 extend inwardly from two opposite side edges and a plate-like member 37 is carried upon the valve stem 29 between the flanges 36 of the member 35, the flanged member 35 and the plate-like member 37 forming a stop member 37', as is hereinafter explained. A coil spring 38 has its outer end bearing upon the stop member and its inner end bearing in a counter-bore in the front or outer face of the valve member 31 with which it is associated. The spring 38 thereby holds the plate-like member 37 in the flanged member 35 and also holds each valve member 31 upon its seat.

The outer ends of the valve stems 29 are intended to project past the front face, not shown, of the range and are flattened as indicated at 39 to receive and rotate with a suitable knob, likewise not shown.

As illustrated in Figure 3, each of the upper valve seats 24 and 25 has a supply port 42 opening thereto from the central gas chamber or manifold 20 and in order that each of these two valve seats may control two burners, each seat is provided with an outlet port 43 on one side of the supply port 42 and an outlet port 44 on the opposite side of the supply port. In the present embodiment, the outlet ports 43 and 44 are respectively arranged above and below the supply port and are approximately 90° apart. Each outlet port opens to an outlet passage 45 extending toward the side edge of the valve body 15 adjacent which its seat is arranged, and collars 46 having nipples 47 threadedly connected thereto are threaded in the outlet passages. As best shown in Figure 1, the two nipples 47 provided on each side of the valve body extend into the inlet of a Venturi tube 49, the Venturi tube being divided by a partition wall so that two separate gas and air passages extend therethrough, one to each of the burners to which the Venturi tube will be connected. It will of course be understood that separate Venturi tube structures could be provided for each nipple, the tube arrangement forming no part of the present invention.

As is indicated in Figure 3, the supply ports 42 of the valve seats 24 and 25 are adjacent the inner edges of the seats, thereby making it possible to reduce the size of the central gas supply chamber or manifold 20 from which they extend.

The plate structure 32 is preferably formed of a number of segments or sections 55, corresponding to the number of valve seats, in the present instance, four. The segments are held rigid with respect to each other and to the valve body 15 by reason of the fact that each segment is secured adjacent one outer corner thereof to the post 33 at the corresponding corner of the valve body by a screw or the like and the diagonally opposite inner corner bears upon a central post 33, being held against the latter post by an arcuate washer 56 held in place by a machine screw. The opposed edges of the segments 55 abut, as indicated in Figure 1, and each segment substantially overlies one of the valve seats of the valve body. By this arrangement, any valve seat and its associated valve element can be readily cleaned by removing the segment 55 overlying that valve and without disturbing the other valves, the segment being removed by withdrawing the screw which holds it to the corresponding corner post 33 and by then loosening the screw in the central post 33' which retains the washer 56 in position. With the arcuate washer 56 thus free to turn, it may be rotated so as to engage and retain only the other three segments 55 and the desired segment may be entirely removed.

Each of the segments 55 which is positioned opposite the upper valve seats 24 and 25 is provided with a lock aperture 58 and a plurality of smaller and stop apertures 59. As shown in Figure 1, in the preferred form of our structure, three stop apertures 59 are provided on each side of the lock aperture 58, all of the apertures being positioned on the same circular line, the axis of the line being the axis of the valve stem. In the present embodiment, one of the stop apertures 59 is positioned at a point 45°, 90°, and 135° on each side of the lock aperture 58.

The plate-like members 37 provided on the valve stems extending from the valve seats 24 and 25 are each provided with a stud 60 projecting toward the corresponding segments 55 and the aperture 58 of each of these segments is of sufficient size to receive this stud. The stud 60 has a ball-shaped outer end 61 adapted to fit into the stop apertures 59, these latter apertures being of insufficient size to permit the entire stud 60 to be positioned therein. The lock aperture 58 is so positioned that when the valve is in closed position, the stud 60 will be held in the aperture by the spring 38, making it necessary to press the valve stem inwardly against the action of the spring to release the stud from the lock aperture 58 before the valve stem and valve can be turned, the stud thereby serving as a locking means. In the turning movement of the valve, the ball end 61 of the stud will seat in the smaller and stop apertures 59, thereby serving as a stop to indicate when the valve is properly positioned for a desired flow of gas to the burners.

The disc valves or valve elements used with each of the valve seats 24 and 25 of the valve body are of identical form and, as best shown in Figures 3a and 3b, the seat face of each such valve element 31 is provided with two arcuate grooves 62 and 63 respectively, which grooves are relatively wide and deep and extend over a distance corresponding to the overall spacing of the outlet ports in their seat faces, in the present embodiment, 90°. At one end thereof, the two grooves are connected by a relatively shallow and narrow groove 64, the groove 64 being of least width and depth at the point 65 centrally intermediate its ends. For convenience, the disc valve 31 applied to the seat 24 is designated by the numeral 24a and that applied to the seat 25 is designated by the numeral 25a.

Figure 5 shows the valve element 24a in the position with respect to the supply and outlet ports which it will occupy when in closed position. In such position, shallow groove 64 which connects the grooves 62 and 63 is distant from the seat face ports of the valve body and the opposite ends 62' and 63' of the grooves 62 and 63 overlie the outlet ports 43 and 44, the blank portion the seat face of the disc valve being opposite the supply port 42 so that no gas may flow. If the valve is rotated 45° in a clockwise direction to the position indicated in Figure 6, the upper groove 62 will bridge the supply port 42 and the upper outlet port 43 so that gas may flow to the burner controlled by the latter port, as indicated by the arrow. At this time, the ball end 61 of the member 37 will be positioned in the lower aperture 59 next adjacent the lock aperture 58. It will, of course, be understood that the valve disc may be turned to any position between the 45° position referred to and thereby permit a medium or low flame to the burner through the port 43 by reason of the fact that the end 62' of groove 62 will only partly extend over the supply port 42.

A slightly further movement of the valve disc 24a in a clockwise direction from the position shown in Figure 6 will cause the end 62' of the groove 62 to move over the lower outlet port 44 with the result that a reduced flow of gas will occur to the burner controlled through this port, a full flow still moving to the burner controlled through the upper outlet port 43. Continued movement of the valve element to turn it 90° from off position as shown in Figure 7 will cause the port 62 to entirely bridge both outlet ports 43 and 44 and supply port 42 with the result that a full flow will occur to both burners. At this time, the ball end 61 of stop 37 will be seated in the second plate structure stop aperture 59 from the lower side of lock aperture 58. Slightly further movement will result in a lower flow to the burner controlled by upper port 43 while the full flow continues through port 44 and when the valve element 24a has been turned 135° to the position indicated in Figure 8, so that the ball end 61 of stop member 37 seats in the stop aperture 59 most distant from lock aperture 58, there will be a full flow to lower burner port 44 and the only flow to upper port 43 will be through the shallow groove 64, permitting a simmering flame at the burner controlled by port 43. With the disc valve turned to 180° from closed position as indicated in Figure 9, the central and most restricted portion 65 of the shallow portion 64 will be directly opposite the supply port 42 and the ends of the shallow groove will be opposite the outlet ports 43 and 44 so that only sufficient gas to permit a simmering flame at both burners will flow.

When the valve disc 24a is rotated in a counterclockwise direction, after a turning movement of 45°, the lower groove 63 thereof will bridge the supply port 42 and the lower outlet port 44, thereby permitting gas to flow to the burner controlled by the latter port. Turning movement to the 90° position will cause gas to flow through both outlet ports 43 and 44 and when the valve element is turned 135°, a full flow of gas will be obtained through the upper outlet port 43 while only a simmering flow will occur to the lower outlet port 44. At each of these three positions the ball end 61 of the stop member will engage in a stop aperture 59. When the valve element has been turned 180°, simmering flow will occur to both outlet ports. It will be understood that the valve disc may be turned to any position intermediate the four positions described above and the fact that the grooves have rounded ends will permit the flow to be very finely adjusted.

The operation of the valve 25a provided upon the seat 25 will be obvious from the description of the valve 24a set forth above.

The lower valve seat 26 is provided with a supply port 68 opening from the manifold or chamber 20 and an outlet port 69 spaced from the supply port, which outlet port opens to a passage having a pipe 70 threaded therein, this pipe extending to the broiler burner of the range. In the present embodiment, these ports are spaced 90°. The disc valve or valve element 26a positioned upon the seat 26 is provided with a relatively deep and wide groove 72 having a narrow and shallow groove 73 opening from the leading end thereof as illustrated in Figures 3c and 5. In the present form of the invention, groove 72 extends through 90°, that is, it is sufficiently long to bridge the seat face ports 68 and 69.

In the closed position of the valve element 26a, the leading end of groove 72 is aligned with the outlet port 69 and the shallow groove 73 extends toward the supply port 68 but is not in alignment therewith. At this time, also, the stud 61 of the stop member 37' is positioned in the lock aperture 58 provided in the corresponding segment 55 of the plate structure, and the opposite end of the stop member 37' is against a pin 75 extending inwardly from that segment. Rotation of the valve element slightly less than 90° in a counterclockwise direction will cause the shallow and narrow groove 73 to first move opposite the supply port 68 with the result that a small flow of gas will occur through the shallow groove and thence through the larger groove 72 to the outlet port 69. Continued turning movement will, of course, bring the deeper groove 72 into position to bridge both the supply port 68 and the outlet port 69, permitting a full flow to the broiler burner. A second stop pin 76 is provided upon the inner side of the plate 55 against which the stop member 37 will abut after the valve has been rotated through approximately 90° and at which time a full flow will occur to the burner. A second stop pin 76 is provided upon the inner side of the plate 55 against which the stop member 37 will abut after the valve has been rotated through approximately 90° and at which time a full flow will occur to the burner.

The remaining valve seat 27 is provided with a supply port 78 opening from the gas manifold or chamber 20 and is also provided with an outlet port 79 opening to a passage having a pipe 80 fitted therein, the pipe 80 extending to the oven burner. The disc valve or valve element 27a provided upon the seat 27 has a groove 81 therein also having rounded ends. In the embodiment of the invention disclosed, the seat face ports are 90° apart and the valve element groove 81 is of corresponding length so that it may bridge the ports.

When the valve element 27a is in closed position, the leading end of groove or passage 81 will be opposite the outlet port 79 but rotation of the valve element will cause the groove to bridge both the ports 78 and 79 so that gas may flow to the oven burner. It will be observed that because the leading end of the groove 81 is rounded, the flow of gas to the oven may be regulated to the desired degree according to the position of this end of the groove with respect to the supply port 78. The segment or plate 55 of the plate structure 32 which is positioned opposite the oven valve seat 27 is provided with stops 82 and 83 against which the stop member 37 provided upon the valve stem of the open valve will contact when the valve has been rotated through 90°.

It will be understood that the invention is not limited to the details of construction shown in the drawings and described in the specification, and that the example of the use of the device which has been given does not include all of the uses of which it is capable; also, that the phraseology employed in the specification is for the purpose of description and not of limitation.

We claim:—

1. A valve structure comprising a valve body, a plate secured to the valve body, a valve element movable with respect to the valve body, and positioned between the latter and the plate, the plate having a lock aperture and a stop aperture therein, means moving with the valve element to engage the plate apertures, and spring means positioned between the valve element and plate to hold the valve element seated and to tend said means into engagement with the plate apertures.

2. In combination, a valve body, a valve element, a stem carrying said valve element and rotatable in said valve body, a plate spaced from said valve body and into which the free end of said stem extends, a member rigid with said valve stem and bearing against the inner side of said plate, a member loose on said stem and seated in said last-named member, and spring means between said valve element and said loose member to hold said valve element seated and to hold said loose member engaged with said plate, said loose member being adapted to cooperate with said plate to hold said stem in adjusted position.

3. A valve structure comprising a valve body provided with a plurality of valve seats, posts projecting from the edges and the center of the seat face of said valve body, a plate section supported on each edge post and the center post and opposite each seat face, a valve member movable on each seat face, means between a plate section and the corresponding valve element to hold the latter on its seat, and means to secure the plate sections to the center post permitting removal of one section without removal of the remaining sections.

4. A valve structure for gas ranges comprising a valve body fixed with respect to the range and provided with a plurality of valve seats, posts projecting from the edges and the center of the seat face of said valve body, a plate section supported on each edge post and the center post and opposite each seat face, a valve member movable on each seat face, means moving with each valve element and cooperating with the corresponding plate section to tend to hold the valve element in adjusted position, means between a plate section and the corresponding valve element to hold the latter on its seat and to hold said last-named means in cooperating engagement with its plate section, and means to secure the plate sections to the center post permitting removal of one section without removal of the remaining sections.

BEST PRATT.
GEORGE F. WEINREICH.